United States Patent [19]

Mancinelli

[11] Patent Number: 4,503,188

[45] Date of Patent: Mar. 5, 1985

[54] ACRYLATES AS COUPLING AGENTS FOR STAR-BLOCK COPOLYMERS

[75] Inventor: Paul A. Mancinelli, Aston, Pa.

[73] Assignee: Atlantic Richfield Company, Los Angeles, Calif.

[21] Appl. No.: 506,165

[22] Filed: Jun. 20, 1983

[51] Int. Cl.³ .......................................... C08F 287/00
[52] U.S. Cl. ...................................... 525/98; 525/305
[58] Field of Search .................................. 525/305, 98

[56] References Cited

U.S. PATENT DOCUMENTS

| | | | |
|---|---|---|---|
| 3,280,084 | 10/1966 | Zelinski et al. | 525/271 |
| 3,502,338 | 3/1970 | Cox | 525/305 |
| 3,956,424 | 5/1976 | Murayama et al. | 525/305 |
| 4,033,840 | 5/1977 | Fujiwara et al. | 525/305 |
| 4,064,199 | 12/1977 | Nishikawa | 525/305 |
| 4,225,682 | 9/1980 | O'Neal | 525/305 |
| 4,281,083 | 7/1981 | Arbit | 525/305 |
| 4,424,293 | 1/1984 | Nojiri et al. | 525/305 |

FOREIGN PATENT DOCUMENTS

| | | |
|---|---|---|
| 44166 | 1/1982 | European Pat. Off. |
| 49775 | 4/1982 | European Pat. Off. |
| 46-38910 | 11/1971 | Japan |

Primary Examiner—Joseph L. Schofer
Assistant Examiner—Bernard Lipman
Attorney, Agent, or Firm—Lewis J. Young

[57] ABSTRACT

A new class of multi-ester coupling agents has been disclosed which have the general formula, $(CH_2=CH-CO_2)_n X$, where X is a radical from a polyhydroxy compound having 2 to 6 hydroxyl groups, and n is an integer equal to the number of hydroxy groups in the polyhydroxy compound. These coupling agents undergo anionic polymerization through the acrylate unsaturation rather than anionic attack at the ester linkage.

8 Claims, No Drawings

ACRYLATES AS COUPLING AGENTS FOR STAR-BLOCK COPOLYMERS

BACKGROUND OF THE INVENTION

This invention relates to new coupling agents for use in preparing star-block polymers and copolymers by solution polymerization or copolymerization of conjugated dienes and monovinyl aromatic monomers with alkyllithium initiators.

Highly branched block copolymers, sometimes called star-block copolymers, are old in the art of anionic polymerization. These star-block copolymers are prepared by first forming linear block polymers having an active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave star-block copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Zelinski, U.S. Pat. No. 3,281,383, teaches similar star-block copolymers to those in U.S. Pat. No. 3,280,084, except that coupling agents such as polyepoxy compounds, polyacids, polyaldehydes, etc., are used.

Childers, U.S. Pat. No. 3,637,554, prepares rubbery star-block copolymers having nuclei formed from polyepoxides, polyisocyanates, polyimines, etc., and identical arms from B-Li and A-B-Li.

Fetters et al, U.S. Pat. No. 3,985,830, discloses a product having a nucleus of more than one molecule of m-divinyl-benzene and at least three polymeric arms, each being a block copolymer of conjugated diene and monovinyl aromatic monomers wherein said conjugated diene block is linked to said nucleus.

Kiovsky, U.S. Pat. No. 4,077,893, teaches the use of various coupling agents to prepare lubricating oil additives. Among those coupling agents mentioned is ethyleneglycoldimethacrylate.

Bean et al, U.S. Pat. No. 4,304,886, prepares mixtures of star-block copolymers by coupling lithium metal-terminated polymers or copolymers with a mixture of two different coupling agents having different functionality.

Udipi, U.S. Pat. No. 4,309,517, teaches to use hydrocarbyl esters of N-cyclopropyl-N-hydrocarbylcarbamic acids as coupling agents.

SUMMARY OF THE INVENTION

I have now found that star-block polymers can be prepared having from 3 to 20 arms per molecule by the use of a agent which is a multiester of formula $(CH_2=CH-CO_2)_{\overline{n}}X$, where X is the radical of a polyhydroxy compound having 2 to 6 hydroxy groups, and n is an integer equal to the number of hydroxy groups in the polyhydroxy compound.

DESCRIPTION OF THE INVENTION

This invention is applicable to the coupling of living polymer molecules prepared from monovinyl aromatic monomers, conjugated dienes and mixtures thereof using a hydrocarbyllithium initiator such that the polymer or copolymer has a lithium attached to the terminal monomer unit of the polymer chain. The resultant lithium-terminated polymers are then coupled by the addition of a coupling agent to form star-block polymers or copolymers having from 3 to 20 arms.

This invention lies in the use of a new coupling agent having the unexpected ability to couple many arms. The agent is a multiester of formula $(CH_2=CH-CO_2)_{\overline{n}}X$, where X is the radical of a polyhydroxy compound having from 2 to 6 hydroxy groups, and n is an integer equal to the number of hydroxy groups in the polyhydroxy compound.

The monovinyl aromatic monomer useful in the invention is preferably styrene, but may be alkyl substituted styrenes which have similar copolymerization characteristics, such as, alphamethylstyrene and the ring substituted methylstyrenes, ethylstyrenes and t-butylstyrene.

The hydrocarbyllithium initiators useful in the invention are the known alkyllithium compounds, such as methyllithium, n-butyllithium, sec-butyllithium; the cycloalkyllithium compounds, such as cyclo-hexyllithium; and the aryllithium compounds, such as phenyllithium, p-tolyllithium and naphthyllithium.

The amounts of hydrocarbyllithium added should be between 0.2 and 10.0 millimoles per mole of monomer. The total amount of initiator used depends on the molecular weight and number of polymer chains desired.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like. The polymerization is carried out in the absence of air, moisture, or any other impurity which is known to be detrimental to anionic catalyst systems. The temperature of polymerization may be conventionally from 0° to 120° C., and preferably between 40° and 80° C.

The polyfunctional coupling agents suitable for the invention are the acrylate esters of polyhydroxy compounds having 2 to 6 hydroxy groups per molecule.

Although Kiovsky, in U.S. Pat. No. 4,077,893, teaches the use of diethyleneglycoldimethacrylate as coupling agent, it has been found that the dimethacrylate leads only to diblock and triblock linear copolymers and not to star-block copolymers.

The polyhydroxy compounds may be glycols, such as ethylene glycol, diethylene glycol, 1,6-hexanediol, tetraethylene glycol, tripropylene glycol, 1,3-butylene glycol, and neopentyl glycol; triols, such as glycerol, and trimethylolpropane; tetrols, such as pentaerythritol and erythritol; pentols, such as pentanepentol; hexols, such dulcitol, mannitol, and sorbitol; and polyhydroxybenzenes, such as hydroquinones, pyrogallol, phloroglucinol, tetrahydroxybenzene (all isomers), and hexahydroxybenzene.

It is critical that all of the hydroxy groups be esterified in order to eliminate termination reactions between the hydroxyl hydrogen and the lithium-terminated polymer chains. This, of course, leads to unlinked diblock polymer, rather than to the desired coupling reaction.

The esters can be prepared by reacting the hydroxy compounds with acryloyl chloride in the presence of a weak base, such as aniline, to absorb the liberated hydrogen chloride. Many of the useful esters are commercially available. Typical of these are ethylene glycol diacrylate, triethylene glycol diacrylate, 1,6-hexanediol diacrylate, neopentyl glycol diacrylate, available from Ware Chemical, a Division of Dart Industries and tetraethylene glycol diacrylate, trimethylolpropane triacrylate, and tripropyleneglycol diacrylate available from Celanese Chemical Company, Inc., and pentaerythritol tetraacrylate available from Sartomer Company, a Subsidiary of Atlantic Richfield Company.

Although the precise mechanism of coupling for the instant multi-esters is not known, the reaction is believed to occur by way of anionic polymerization of the olefinic unsaturation of the acrylate portion of the agent. This would cause a multiple armed copolymer in much the same manner as the coupling with other polymerizable difunctional coupling agent, such as divinylbenzene. Surprisingly the methacrylate esters of these same hydroxy compounds either do not undergo the anionic polymerization through the unsaturation of the methacrylate to the same extent as their acrylate analogs or undergo side reactions to give predominantly diblock or triblock copolymers rather then the desired star-block copolymers. This was surprising because methacrylates normally undergo anionic polymerization more readily than acrylates. The preferred temperature range of coupling is 30° to 60° C.

The amount of coupling agent used in the present process depends on the conditions of reaction and the number of arms desired in the final star-block copolymers. Generally, the agents are used in ratios of the coupling agent to the lithium ion concentration of from 2:1 to 10:1.

The conjugated dienes and/or monovinyl aromatic monomers can be polymerized alone to form homopolymers or in admixture to form random, tapered, true block, or other known structure in the lithium terminated polymers. Resinous polymer arms can be formed by using high monovinyl aromatic monomer concentration such as from 55 to 95 percent by weight based on total monomer. Elastomeric polymers or copolymers will have only from 5 to 55 percent by weight of the monovinyl aromatic monomers present. The coupling efficiency of the agent has been shown to be greater if the terminal monomer is isoprene rather than butadiene. It is thus preferred to have at least a small portion of the polymer chains terminated with a conjugated diene to which the lithium is attached. It is possible, however to make polystyrene homopolymer star-block polymers using the instant multi-ester coupling agents.

Although the following examples are primarily related to high diene copolymers, the examples are not intended to limit the scope of the coupling reaction to the exclusion of high styrene systems.

The following examples are given to illustrate the invention, but not to limit the claims. All parts and percentages are by weight unless otherwise specified.

EXAMPLE I

A one gallon stirred reactor was charged with 2,000 g. of purified cyclohexane and heated to 60° C. A trace of diphenylethylene (0.2 g.) was added to the cyclohexane by means of a hypodermic needle. A solution of sec-butyl-lithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 8.86 m. moles of sec-butyllithium and 274.7 g. of styrene and the reactor held at 60° C. for 20 minutes. Analysis of the solution by U.V. analysis showed that less than 0.01% by weight of the styrene monomer remained. Number averaged molecular weights ($M_n$) of the polystyrene blocks were determined by Gel Permeation Chromatographyto be 31,000. At this point, 322.5 g. of butadiene was added to the reactor and the whole mixture held for 60° C. for 75 minutes to complete the polymerization of the butadiene. The diblock arms thus formed were analyzed by refractive index and found to be 46% by weight styrene and 54% butadiene. There was then added 53.16 m. mole of pentaerythritol tetracrylate (as a 1.5 m. solution in xylene) and the whole was held for 90 minutes at 60° C. to complete the linking reaction. The system was terminated by the addition of 1 g. of methanol. The polymer was then treated with 0.5 part Polygard HR, a commercial antioxidant, and 0.5 part 2,6-ditert-butyl-4-methylphenol per 100 parts by weight of polymer. The polymer solution was air dried to remove most of the solvent and then the polymer was dried at 50° C. in an oven under vacuum at less than 100 microns of mercury.

Analysis of the resulting polymer mixture by Gel Permeation Chromatography showed 3% by weight unlinked polystyrene, 17% by weight unlinked diblock polymers, 17% by weight linked triblock polymers, and 63% by weight star-block polymer having about 11 linear diblock arms per molecule. Each arm has $M_n$ of about 67,400, made up of a polystyrene block of $M_n$ 31,000 and a polybutadiene block of $M_n$ 36,400. The tetraacrylate was present in an amount of 6 parts of coupling agent per part of butyllithium initiator.

EXAMPLE II

The procedure of Example I was repeated except the pentaerythritol tetraacrylate was replaced with trimethylolpropane triacrylate as the linking agent.

The resulting polymer mixture contained 4% by weight unlinked polystyrene, 15% by weight of unlinked diblock polymer, 25% by weight of linked triblock copolymer and 56% by weight of a star-block copolymer having about 10 linear arms per molecule. Each arm had $M_n$ as in Example I. Again, the ratio of coupling agent to lithium initiator was 6.0

EXAMPLE III

To illustrate the effect of capping the diblock arms with isoprene prior to linking, the procedure of Example I was duplicated except only 312.8 g. of butadiene were added to the polystyryl lithium segments. Then 9.7 g. of isoprene was added and the mixture held at 60° C. for 15 minutes. The pentaerythritol tetraacrylate was added as before and the polymer mixture analyzed.

The product was 4 wt-% polystyrene, 14 wt-% unlinked triblock copolymers, 17 wt-% linked triblock copolymers, and 65 wt-% star-block copolymer having about 12 linear arms of 46 wt-% styrene, 51 wt-% butadiene and capped with 3 wt-% isoprene. The ratio of tetraacrylate to lithium was 6.0.

Repeating the above using a ratio of tetraacrylate to lithium of 9.0 gave 64 wt-% of a star-block copolymer having about 12 linear arms, as before.

EXAMPLE IV

A one gallon stirred reactor was charged with 1820 g. of purified cyclohexane and heated to 80° C. The solvent was treated with diphenylethylene and sec-butyl-lithium to remove impurities as in Example I. Into the closed reactor was charge 9.8 L m. mole of sec-butyllithium and 147 g. of styrene and the reactor held at 80° C. for 10 minutes. The polystyrene was completely polymerized to a polymer $M_n$ 15,000. An additional 9.8 m mole of sec-butyllithium was then added and a continuous feed of 833 g. of isoprene was added over a period of 30 minutes using a controlled volume minipump. When the last of the isoprene was added, the whole mixture was maintained at 80° C. for an additional 15 minutes. At this point, the mixture contained equal amounts of two different polymeric chains having lithium end groups. One group of chains consisted of a diblock copolymer having polystyrene blocks of $M_n$ 15,000 followed by polyisoprene blocks of $M_n$ 42,500. The other group of chains consisted of polyisoprene of $M_n$ 42,500. In both cases, lithium was attached to the isoprene end of the chains. The solution containing these living polymer chains was then reached with 117.6 m mole of pentaerythritol tetraacrylate (PTA/Li=6.0) at 60° C. for 90 minutes to form a star-block copolymer having statistically equal numbers of the two types of arms. The system was terminated with methanol, treated with antioxidants, and the polymers recovered as before. There was 10 wt-% unlinked arm content, 8 wt-% diarm content, and 82 wt-% star-block copolymer content. The star-block copolymer had $M_n$ 80,000, indicating the presence of 16 arms, 8 of the poly(styrene-isoprene) structurem and 8 of the polyisoprene structure. The overall composition of the copolymer was 15% by weight of styrene and 85% by weight of isoprene.

EXAMPLE V

The method of Example IV was repeated except that 11.3 m moles of initiator were added in each of the two polymerization steps and 135.6 m moles of trimethylolpropane triacrylate was added instead of the pentaerythritol tetraacrylate. Again, a copolymer of 15% by weight of styrene and 85% by weight isoprene was prepared.

The polymer product was 19 wt-% unlinked arm content, 19 wt-% linked diarm content and 62 wt-% of star-block copolymer having about 12 arms, of which 6 were polyisoprene blocks of $M_n$ 36,800 and 6 were diblock arms having polystyrene blocks of $M_n$ 13,000 and polyisoprene blocks of $M_n$ 36,800. The star-block copolymers had $M_n$ of 519,600.

EXAMPLE VI

To illustrate the lower efficiency of methacrylates toward star-polymer formation compared to that of acrylates a series of polymerizations were run as follows:

A one gallon reactor containing 2,000 g. of purified cyclohexane was readied for polymerization of monomer as in Example I. Into the closed reactor was charged 8.86 m moles of sec-butyllithium and 132.9 of styrene and the reactor held at 60° C. for 20 minutes. The $M_n$ was 15,000 for the resulting polystyrene blocks.

At this point, 132.9 g. of butadiene were added and the whole mixture held at 60° C. for 75 minutes to form diblock arms of 50/50 wt-% styrene/butadiene and having average $M_n$ of 30,000. There was then added either 17.72 m moles (coupling agent/RLi=2), 26.58 m moles (coupling agent/RLi=3), 35.44 m moles (coupling agent/RLi=4), or 53.16 m moles (coupling agent/RLi=6), of the desired linking agent and the temperature held at 30° C. to complete the linking reaction. After termination and separation of the polymeric product the results shown in Table I were obtained for unlinked diblock (DB), linked triblock (TB) and starblock.

TABLE I

| Coupling Agent | Agent/Li | DB, % | TB, % | Starblock, % (arms) |
|---|---|---|---|---|
| EGDMA[a] | 3 | 50 | 50 | — |
| EGDMA | 6 | 28 | 72 | — |
| EGDA[b] | 2 | 36 | 64 | — |
| EGDA | 6 | 19 | 45 | 36 (5) |
| TMPTMA[c] | 2 | 22.3 | 62.6 | 12 (5) |
| TMPTA[d] | 2 | 21 | 29 | 50 (8) |
| TMPTMA | 4 | 13.8 | 66 | 17 (5) |
| TMPTA | 4 | 21 | 28 | 51 (7) |
| PTA[e] | 2 | 33 | 40 | 27 (6.5) |
| PTA | 6 | 15 | 20 | 65 (10.5) |

[a]Ethyleneglycol dimethacrylate;
[b]Ethyleneglycol diacrylate;
[c]Trimethylolpropane trimethacrylate;
[d]Trimethylolpropane triacrylate;
[e]Pentaerythritol tetraacrylate.

The data indicates that the methacrylate linking agents are not as efficient as the acrylate linking agents. The data further indicates that the diacrylates and dimethacrylates are not as efficient in producing star-block copolymers as the tri- and tetraacrylates, although linking to triblock is fairly good with the difunctional linking agents. The trimethacrylate did produce low amounts of star-block copolymers, but the yield was too low for practical usage even at agent/Li ratios of as high as 4.

What is claimed is:

1. In a process for the preparation of star-block homopolymers and copolymers of conjugated diene-monomers alone or with monovinyl aromatic monomers by the solution polymerization of the monomers with a monolithium initiator and then coupling the resultant lithiated homopolymer or copolymer with a coupling agent, the improvement comprising using as the coupling agent, in a ratio of coupling agent to lithium of from 2 to 10, a multiester of formula

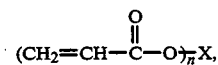

where X is the radical of a polyhydroxy compound having from 2 to 6 hydroxy groups, and n is an integer equal to the number of hydroxy groups in the polyhydroxy compound, whereby a star-block polymer having from 3 to 20 arms per molecule is formed.

2. The process of claim 1 wherein said polyhydroxy compound is selected from the group consisting of glycols, triols, tetraols, pentols, hexols, and polyhydroxybenzenes.

3. The process of claim 1 wherein the lithiated copolymer to be coupled is a block copolymer of 25–55 wt-% monovinyl aromatic monomer and 45–75 wt-% conjugated diene having the lithium attached to the diene block.

4. The process of claim 1 wherein the lithiated copolymer to be coupled is a mixture of (a) block copolymer of monovinyl aromatic monomer and conjugated diene and (c) polyconjugated diene.

5. The process of claim 1 wherein the lithiated copolymer to be coupled is a block copolymer of 55–90 wt-% of monovinyl aromatic monomer and 5–45 wt-% of conjugated diene having the lithium attached to the diene block.

6. The process of claim 1 wherein said multiester coupling agent is pentaerythritol tetraacrylate.

7. The process of claim 1 wherein said multiester coupling agent is trimethylolpropane triacrylate.

8. The process of claim 1 wherein said multiester coupling agent is ethylene glycol diacrylate.

* * * * *